United States Patent [19]

McEwen et al.

[11] Patent Number: 5,965,054

[45] Date of Patent: Oct. 12, 1999

[54] NONAQUEOUS ELECTROLYTE FOR ELECTRICAL STORAGE DEVICES

[75] Inventors: Alan B. McEwen, Melrose; Ein-Eli Yair, Waltham, both of Mass.

[73] Assignee: Covalent Associates, Inc., Woburn, Mass.

[21] Appl. No.: 08/910,143

[22] Filed: Aug. 12, 1997

[51] Int. Cl.$^6$ .............................. H01M 6/16; H01G 9/022
[52] U.S. Cl. ..................... 252/62.2; 252/182.1; 429/188; 429/194; 429/196; 544/224; 544/242; 544/334; 544/336; 546/249; 546/345; 548/146; 548/215; 548/262.2; 548/335.1; 548/343.1; 548/373.1
[58] Field of Search .................................. 252/62.2, 82.1; 429/188, 194, 196

[56] References Cited

FOREIGN PATENT DOCUMENTS 4-233211   8/1992   Japan .

OTHER PUBLICATIONS

McEwen et al., "Nonaqueous Electrolytes for Electrochemical Capacitors: Imidazolium Cations and Inorganic Fluorides with Organic Carbonates," J. Electrochem. Soc., vol. 144, No. 4, pp. L84–L86, Apr., 19.

Arbizzani et al., "Electronically Conducting Polymers and Activated Carbon: Electrode Materials in Supercapacitor Technology," Adv. Mater. vol.:8 No. 4, pp. 331–334 (1996).

Bonhote et al., "Hydrophobic, Highly Conductive Ambient-–Temperature Molten Salts," Inorg. Chem. vol. 35: pp. 1168–1178 (1996).

Carlin et al., "Dual Intercalating Molten Electrolyte Batteries," J. Electrochem. Soc., vol. 141: No. 7, L73–L76 (1994).

Conway et al., "Characterization of Behavior and Mechanisms of Self–Discharge of Electrochemical Capacitors in Relation to that at Batteries," Proceedings of the Fifth International Seminar on Double Layer Capacitors and Similar Energy Devices, Florida Educational Seminars, Dec., 1995.

Conway et al., "The Electrolyte Factor in Supercapacitor Design and Performance: Conductivity, Ion–Pairing and Solvation," Proceedings of the Fourth International Seminar on Double Layer Capacitros and Similar Energy Storage Devices, Florida Educational Seminars, Dec., 1994.

(List continued on next page.)

*Primary Examiner*—Johann Richter
*Assistant Examiner*—Jane C. Oswecki
*Attorney, Agent, or Firm*—Weingarten, Schurgin Gagnebin & Hayes LLP

[57] ABSTRACT

Improved nonaqueous electrolytes for application in electrical storage devices such as electrochemical capacitors or batteries are disclosed. The electrolytes of the invention contain salts consisting of alkyl substituted, cyclic delocalized aromatic cations, and their perfluoro derivatives, and certain polyatomic anions having a van der Waals volume less than or equal to 100 Å$^3$, preferably inorganic perfluoride anions and most preferably $PF_6^-$, the salts being dissolved in organic liquids, and preferably alkyl carbonate solvents, or liquid sulfur dioxide or combinations thereof, at a concentration of greater than 0.5M and preferably greater than 1.0M. Exemplary electrolytes comprise 1-ethyl-3-methylimidazolium hexafluorophosphate dissolved in a cyclic or acylic alkyl carbonate, or methyl formate, or a combination therof. These improved electrolytes have useful characteristics such as higher conductivity, higher concentration, higher energy storage capabilities, and higher power characteristics compared to prior art electrolytes. Stacked capacitor cells using electrolytes of the invention permit high energy, high voltage storage.

12 Claims, 6 Drawing Sheets

OTHER PUBLICATIONS

Cooper et al. Proceedings of the 8th International Symposium on Molten Salts, R.J. Gale, G. Blomgren, and H. Kojima, Editors, PV 92–16, pp. 386–396 "New, Stable, Ambient–Temperature Molten Salts," The Electrochemical Society: Pennington, NJ (1992).

Fuller et al., "Structure of 1–Ethyl–3–methylimidazolium Hexafluorophosphate: Model for Room Temperature Molten Salts," J. Chem. Soc., Chem. Commun., pp. 299–300 (1994).

Ishikawa et al., "Electric Double–Layer Capacitor Composed of Activated Carbon Fiber Cloth Electrodes and Solid Polymer Electrolytes Containing Alkylammonium Salts," J. Electrochem. Soc., vol. 141: No. 7, (1994).

Koch et al., "The Interfacial Stability of Li with Two New Solvent–Free Ionic Liquids: 1,2–Dimethyl–3–propylimidazolium Imide and Methide'" J. Electrochem. Soc., vol. 142: No. 7 (1995).

Koch et al., "The Intrinsic Anodic Stability of Several Anions Comprising Solvent–Free Ionic Liquids," J. Electrochem. Soc., vol. 143: No. 3 (1996).

Koch et al., "High Voltage, Ionic Liquids For Electrochemical Capacitors," The Fourth International Seminar on Double Layer Capacitors and Similar Energy Storage Devices, Dec. 14, 1994.

Koch et al., "The Performance of Solvent–Free Ionic Liquid Electrolytes in Electrochemical Capacitors," The Fifth International Seminar on Double Layer Capacitors and Similar Energy Storage Devices, Dec. 4–6, 1995.

Koresh et al., "Double Layer Capacitance and Charging Rate of Ultramicroporous Carbon Electrode," J. Electrochem. Soc. vol. 124: No. 9 pp. 1379–1385 (1977).

Matsuda et al., "New Electric Double–Layer Capacitors Using Polymer Solid Electrolytes Containing Tetraalkylammonium Salts," J. Electrochem. Soc., vol. 140: No. 7, L109–L110 (1993).

McEwen et al., "EMIPF$_6$ Based Nonaqueous Electrolytes For Electrochemical Capacitors," Abstract No. 707, p. 861, The Electrochemical Society Meeting Abstracts, vol. 96–2, San Antonio, TX, Oct. 6–11, 1996.

McEwen et al., "Nonaqueous Electrolytes for Electrochemical Capacitors: Imidazolium Cations and Inorganic Fluorides with Organic Carbonates," J. Electrochemical Society, vol. 144: L84 (1997).

McEwen et al., "Nonaqueous Double Layer Cpacitors: Electrolyte and Packaging Considerations For High Voltage Devices," Proceedings of the Sixth International Seminar on Double Layer Capacitors and Similar Energy Storage Devices, Florida Educational Seminars, Dec. 9–11, 1996.

McEwen et al., "EMIPF$_6$ Based Nonaqueous Electrolytes For Electrochemical Capacitors," Elecrochemical Capacitors II, F.M. Delnick, D. Ingersoll, X. Andrieu, and K. Naoi, Editors PV96–25, p. 313, The Electrochemical Society Proceedings Series, Pennington, NJ (1977).

Papageorgiou et al., "The Performance and Stability of Ambient Temperature Molten Salts for Solar Cell Applications," J. Electrochem. Soc. vol. 143: No. 10 pp. 3099–3108 (1996).

Takeuchi et al., "Solid polymer electrolyte, battery and solid–state electric double–layer capacitor using this electrolyte as well as processes for their manufacture," CA Selects Plus: Batteries and Fuel Cells, Abstract No. 637063, Issue 23, p. 2, 1996.

Ue et al., "Ionic Radius of $(CF_3SO_2)_3C^-$ and Applicability of Stokes Law to Its Propylene and Carbonate Solution," J. Electrochem. Soc., vol. 143: No. 11 L270–L272 (1996).

Ue et al., "Mobility and Ionic Association of Lithium and Quaternary Ammonium Salts in Propylene Carbonate and γ–Butyrolactone," J. Electrochem. Soc., vol. 141, No. 12:pp. 3336–3342 (1994).

Ue et al., "Electrochemical Properties of Organic Liquid Electrolytes Based on Quaternary Onium Salts for Electrical Double–Layer Capacitors," J. Electrochem. Soc., vol. 141, No. 11:pp. 2989–2996 (1994).

Ue et al., "Nonaqueous electrolyte solution with high electric conductivity for electrochemical capacitor," No.: 728245, 1996 CAPLUS, Japanese Patent Application No. 95–48743, Abstract Only.

Kita et al., "Electrochemical devices containing two electrolytes," No.: 428795, 1995 CAPLUS, Japanese Patent Application No. 93–106143, Abstract Only.

Endo et al., "Electric double–layer capacitor using nonaqueous electrolyte containing cyclobutane– or cyclopropane–derived quaternary ammonium salt," No.: 138075, 1993 CAPLUS, Japanese Patent Application No. 90–408585, Abstract Only.

Endo et al., "Electric double–layer capacitor using nonaqueous electrolyte containing quaternary ammonium salt derived from pyridazine, pyrimidine, or pyrazine," No.: 138075, 1993 CAPLUS, Japanese Patent Application No. 90–408584, Abstract Only.

Morimoto, Takeshi, "Electrolytic double–layer capacitors containing high–performance organic solvents," No.: 49936, 1993 CAPLUS, Kagaku Kogyo (1992), 43(12), 998–1004.

Okamoto et al., "Electric double–layer capacitors with organic electrolytes," No.: 583103, 1990 CAPLUS, Japanese Patent Application No. 88–313397, Abstract Only.

Matsuzaki et al., "Electric double–layer capacitors using a nonaqueous electrolyte," No.: 507627, 1990 CAPLUS, Japanese Patent Application No. 88–230582, Abstract Only.

Cations: Imidazoles

R'=H; R=CH₃ (DMI)
    =C₂H₅ (EMI)
R'=CH₃; R=C₃H₇ (DMPI)

Anions:  Inorganic salts (fluorides)        Organic anions

Solvents: Organic Carbonates cyclic        acyclic        esters

R=H (EC)            R'=CH₃ (DMC)        MF
 =CH₃ (PC)            =C₂H₅ (EMC)
 =C₂H₅ (BC)

NONAQUEOUS ELECTROLYTE FOR ELECTRICAL STORAGE DEVICES

GOVERNMENT RIGHTS

Part of the work leading to this invention was carried out with United States government support provided under Department of Defense contracts F33615-94-C-2469 and Department of Energy contract FG02-96ER82149. Therefore the U.S. government has certain rights in this invention.

FIELD OF THE INVENTION

The present invention relates to nonaqueous electrolytes useful in electrical energy storage devices.

BACKGROUND OF THE INVENTION

Significant effort has been invested over the years in improving the energy and power of electrical energy storage devices such as capacitors and batteries. These are particularly useful in short term, high energy applications such as electric vehicles or cellular communication. Warren et al., U.S. Pat. No. 5,418,682, discloses a capacitor having an electrolyte consisting of tetraalkyammonium salts which include nitrile or dinitrile solvent and teaches that such a system provides a high dielectric constant, which is needed for capacitance. Morimoto et al., U.S. Pat. No. 4,725,926, discloses a nonaqueous electrolyte comprising quaternary phosphonium salts in organic solvents for use in electric double layer capacitors.

A wide variety of solvents and salts are available for such use, offering specific advantages depending on the application being considered (e.g., low temperature vs. high temperature). Ionic liquids based on the imidazolium cation have recently received attention as nonaqueous electrolytes in various electrochemical devices (Koch et al., J. Electrochem. Soc. 143:155, 1996). These electrolytes have significant advantages compared to the numerous quaternary onium salts that have been previously investigated for use in carbon double-layer capacitor electrolytes (Ue et al., J. Electrochem. Soc. 141:2989, 1994).

Electrochemical capacitors based on nonaqueous electrolytes offer greater electrochemical stability (up to 4 V) compared to aqueous systems, thereby providing greater energy storage ($E=\frac{1}{2}CV^2$). However, due to the lower conductivity of nonaqueous electrolytes compared to aqueous systems, lower power capabilities are observed. In addition, with the porous materials used in electrochemical capacitors, the high viscosity typically associated with the high dielectric constant solvents used in nonaqueous electrolytes is detrimental to conductivity in porous electrodes.

Furthermore, the lower ion concentrations typically obtained with nonaqueous electrolytes result in increased electrolyte volume requirements for packaged devices. It is an object of the present invention to solve the above mentioned problems inherent in the use of conventional nonaqueous electrolytes.

SUMMARY OF THE INVENTION

Nonaqueous electrolytes containing salts consisting of alkyl substituted, cyclic delocalized aromatic cations, and their perfluoro derivatives, and certain polyatomic anions having a van der Waals volume less than or equal to 100 $Å^3$, preferably inorganic fluorides and most preferably $PF_6^-$, which are dissolved in organic liquids, preferably alkyl carbonate solvents, or liquid sulfur dioxide ($SO_2$) or combinations thereof, at a concentration of greater than 0.5M and preferably greater than 1.0M, unexpectedly have a high conductivity, higher than the conductivity of the comparable molten salt electrolyte (without added solvent) or the quaternary onium salts. Furthermore, such a nonaqueous electrolyte containing 1-ethyl-3-methylimidazolium ($EMI^+$) and hexafluorophosphate ($PF_6^-$) is particularly useful, having a high conductivity (>13 mS/cm), a large window of electrochemical stability (>2.5 V), a high salt concentration (>1M), high thermal stability (>100° C.), and a large capacitance in a double-layer capacitor (>100 F/g from activated carbon electrodes), this capacitance, surprisingly, being independent of the solvent dielectric.

Thus, the invention generally features a nonaqueous electrolyte for an electrical storage device, the electrolyte including a salt consisting of a cation selected from the group consisting of:

wherein $R_1$, $R_2$, $R_3$, $R_4$, $R_5$, and $R_6$ are either H; F; separate alkyl groups of from 1 to 4 carbon atoms, respectively, or joined together to constitute a unitary alkylene radical of from 2 to 4 carbon atoms forming a ring structure converging on N; or separate phenyl groups; and wherein the alkyl groups, alkylene radicals or phenyl groups may be substituted with electron withdrawing groups; and a perfluoro, inorganic anion or a perfluoro, organic sulfonate anion having a van der Waals volume $\leq 100$ $Å^3$, the salt being dissolved at a concentration of greater than 0.5M in an organic liquid. Preferably, the cation is imidazolium, most preferably 1-ethyl-3-methylimidazolium or 1-methyl-3-methylimidazolium, and the anion is $AsF_6^-$, $BF_4^-$, triflate or, most preferably, $PF_6^-$. The organic liquid is preferably a linear ether, cyclic ether, ester, carbonate, formate, lactone, nitrile, amide, sulfone or sulfolane, and, most preferably, either a cyclic or acyclic alkyl carbonate or methyl formate. Liquid sulfur dioxide or a mixture of sulfur dioxide and an organic liquid are particularly useful in electrolytes of the invention suitable for low temperature use. The addition of other low viscosity agents, which may include gasses (e.g., $CO_2$, $NO_2$, $N_2O$, etc.), may also be used to improve performance, especially at lower temperatures. The electrolyte of the invention may further include, e.g., tetraalkylammonium or tetraalkylphosphonium salt for customization to a particular application.

The nonaqueous electrolytes of the invention are useful in electrical energy storage devices, particularly electrochemical capacitors. These electrolytes can also be used in potentiometric and voltametric electrochemical sensors, photovoltaic devices, fuel cells, and in primary and secondary batteries employing alkali and alkaline earth anode materials so long as the electrolyte contains the cation of the alkali or alkaline earth anode material. Further, the electrolytes of the invention will find use as media for catalysis or ctrocatalysis.

BRIEF DESCRIPTION OF THE DRAWINGS

Other features and advantages of the invention will be apparent from the following detailed description of the invention, taken in conjuction with the accompanying drawings in which.

DETAILED DESCRIPTION OF THE INVENTION

Figure 1:
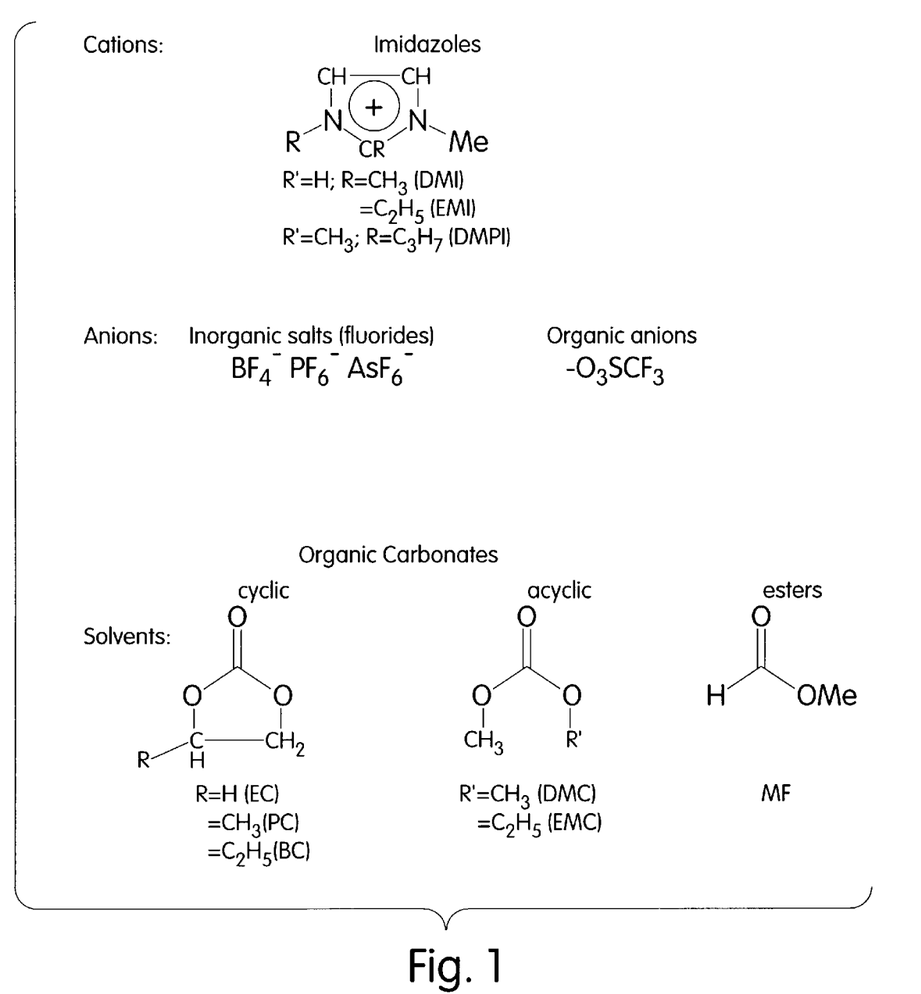
FIG. 1 shows the molecular structures of representative cations, representative anions and representative solvents, useful in the electrolytes of the invention.

The nonaqueous electrolytes of the invention are superior to conventional electrolytes in a number of respects that serve to make them particularly useful in electrical energy storage devices. Specific characteristics of electrolytes of the invention containing 1-ethyl-3-methylimidazolium ($EMI^+$), as the cation, and hexafluorophosphate ($PF_6^-$) or tetrafluoroborate($BF_4^-$), as the anion, in a number of alkyl carbonate solvents were compared to those of prior art electrolytes containing tetraethylammonium tetrafluoroborate ($TEADF_4$) in the same solvents, as described in detail below. The molecular structures of the indicated compounds and solvents are shown in FIG. 1; the physical properties of the indicated solvents are presented in Table 1.

TABLE 1

Physical properties of selected alkyl carbonate solvents at 25° C.

| Solvent | MW | Viscosity ($\eta$)/cP | Dielectric ($\epsilon$) | DN | liquidus range/° C. |
|---|---|---|---|---|---|
| EC | 88 | 1.86 (40° C.) | 95.3 | 16 | 36 to 238 |
| PC | 102 | 2.51 | 64.9 | 15 | −54 to 242 |
| DMC | 90 | 0.59 | 3.12 | — | 3 to 90 |
| EMC | 104 | 0.65 | 2.9 | — | −55 to 108 |
| MF | 60 | 0.33 | 8.5 | — | −99 to 31 |
| $SO_2$ | — | — | — | — | — |

Abbreviations:
EC - ethylene carbonate
PC - propylene carbonate
DMC - dimethyl carbonate
EMC - ethyl methyl carbonate
MF - methyl formate
L. A. Dominey in Lithium Batteries, New Materials: Developments and Perspectives, G. Pistoia, Ed., p. 137, Elsevier Science D.V., Amsterdam (1994)

Solubility The solubility of $EMIPF_6$ was found to be high in all the solvents indicated in Table 1, with greater than 2M concentrations being obtained. Solubilities greater than 3M are common with these electrolytes. Solutions greater than 2M in concentration of $EMIBF_4$ in DMC can also be made. Both $EMIPF_6$ and $EMIBF_4$ are extremely soluble in EC/DMC mixtures with solubilities greater than 2M concentration. In contrast, the salt $TEABF_4$ is extremely insoluble in acyclic alkyl carbonates (Ue et al., Kinou Zairyo 15:48, 1995; Ue et al., J. Electrochem. Soc. 141:2989, 1994; Ue, J. Electrochem. Soc. 141:3336, 1994; Ue, J. Electrochem. Soc. 143:L270, 1996). With PC the maximum solubility of $TEABF_4$ is approximately 1M, significantly less than the 3.5M concentration obtainable with $EMIPF_6$ in PC.

Figure 2:
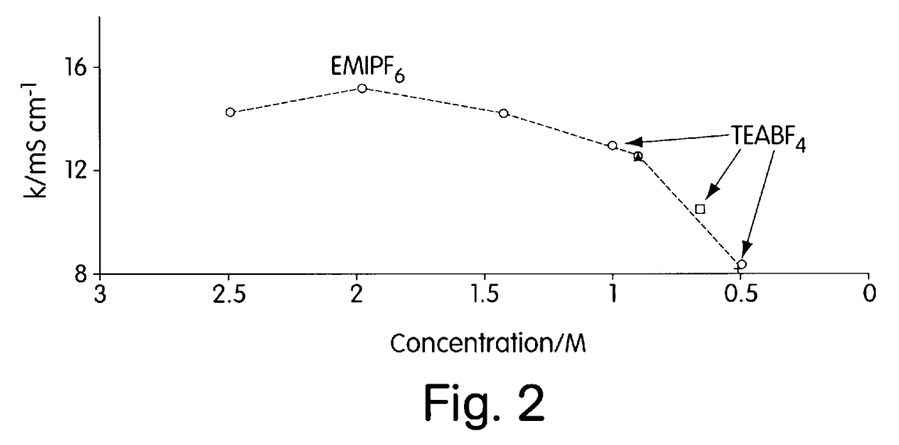
FIG. 2 is a plot of conductivity of propylene carbonate based electrolytes as a function of salt concentration.

Conductivity The specific conductivities($\kappa$) as a function of molar concentration (M) for $EMIPF_6$ in PC at room temperature are compared to the prior art electrolyte $TEABF_4$ in PC in FIG. 2. For $EMIPF_6$ the maximum conductivity is 15.3 mS/cm at 2M concentration. The determined conductivity for 1M $TEABF_4$/PC is 13 mS/cm (Ue et al., J. Electrochem. Soc. 141:2989, 1994). Also depicted in FIG. 2 are additional literature conductivity values for other concentrations of $TEABF_4$ in PC: 10.6 mS/cm for 0.65M and 8.3 mS/cm for 0.5M concentrations (Morimoto et al., Mat. Res. Soc. Symp. Proc. 393:397, 1995; Ue et al., J. Electrochem. Soc. 141:2989, 1994). These values correspond to the conductivity observed for similar concentrations of $EMIPF_6$ in PC. In other words, the conductivity of $EMIPF_6$ in PC below 1M concentration is similar to that observed for $TEABF_4$ in PC. An advantage of $EMIPF_6$ over tetraalkylammonium salts is the high solubility (>3M) in contrast to the saturation limit of about 1M for $TEABF_4$ in PC.

TABLE 2

Specific conductivity (k), at 25° C.

| Solvent (a) | Salt | Conc. | k/mS/cm |
|---|---|---|---|
| EC | $EMIPF_6$ | 2M | 22 |
| PC | $EMIPF_6$ | 2M | 15 |
| DMC | $EMIPF_6$ | 2M | 21 |
| DMC | $EMIBF_4$ | 2M | 20 |
| EMC | $EMIPF_6$ | 2M | 14 |
| MF | $EMIPF_6$ | 2M | 32 |
| MF | $EMIPF_6$ | 3M | 33 |
| EC/DMC | $EMIPF_6$ | 2M | 26 |
| EC/DMC | $EMIBF_4$ | 2M | 27 |
| PC/EMC | $EMIPF_6$ | 2M | 18 |
| PC/MF | $EMIPF_6$ | 2M | 34 |

(a) mixtures of solvents are at a ratio of 1:1 (v/v)

Referring to Table 2, the conductivity of $EMIPF_6$ in several different carbonate solvents at 2M concentration was compared. A 2M solution of $EMIPF_6$ in DMC has an excellent conductivity of 21 mS/cm. This result in combination with the low viscosity (0.59 cP) and acceptable dielectric constant ($\epsilon$=3.12) of DMC means that this compound is a very good solvent for $EMIPF_6$-based electrolytes. Similarly, a high conductivity (22 mS/cm) was observed with a 2M $EMIPF_6$ solution in EC. The two carbonate solvents EC and DMC provide higher conductivity electrolytes with $EMIPF_6$ than do PC (15 mS/cm) and EMC (14 mS/cm). A 3M solution of $EMIPF_6$ in MF has an excellent conductivity of 33 mS/cm while a 2M solution of $EMIPF_6$ in MF also has a high conductivity of 32 mS/cm. The greater than 2M solution of $EMIBF_4$ in DMC has a conductivity of 20 mS/cm. This value is substantially greater than the conductivity for the pure $EMIBF_4$ ionic liquid alone (13 mS/cm).

The mixture of solvents EC and DMC (1:1, v/v) results in 2M electrolytes with excellent conductivities of 26 mS/cm ($EMIPF_6$) and 27 mS/cm ($EMIBF_4$). A 2M solution of $EMIPF_6$ in PC/MF also has an excellent conductivity of 34 mS/cm. An increase in conductivity, to 18 mS/cm, is also observed with the addition of a high dielectric component such as PC to EMC.

Figure 3:
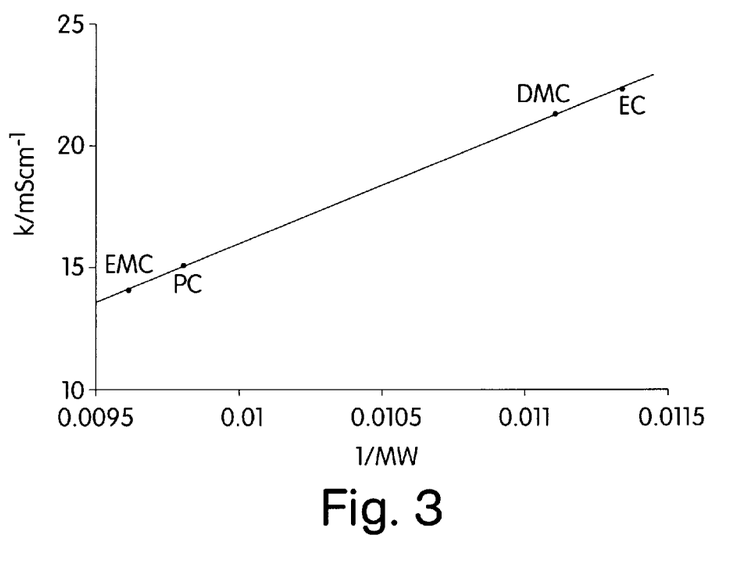
FIG. 3 is a plot of conductivity versus the reciprocal of solvent molecular weight for 2M $EMIPF_6$ in alkyl carbonates.

As shown in FIG. 3, a strong correlation (r=1.00) between the conductivity of 2M $EMIPF_6$ solutions in the indicated alkyl carbonate solvents and the reciprocal of solvent molecular weight was observed, indicating that smaller solvent molecules result in greater conductivity compared to electrolytes at similar concentrations of salt in solvents with larger solvent molecules. Little correlation was observed between the conductivity and the dielectric constant as both EC and DMC solutions have similar conductivities, yet the dielectric constants for these two solvents are substantially different, as shown in Table 1. A small correlation of the reciprocal of the viscosity of the solvent to conductivity was apparent. These results indicate that $EMIPF_6$ is effectively equally dissociated in those solvents, with $\epsilon$>3.

Temperature range A 2M solution of $EMIPF_6$ in PC was determined to have a wide temperature stability range of use, from −40° C. to above 130° C. Methyl formate solutions are particularly useful as low temperature electrolytes. A 2M solution of $EMIPF_6$ in methyl formate has a useful temperature range of less than −60° C. to +40° C. Also useful as low temperature electrolytes are liquid $SO_2$ solutions, which would have a boiling temperature of −10° C., or mixtures of $SO_2$ and specific organic solvent(s), which would have improved low temperature conductivity over the specific organic solvent or solvents alone. For example, a 2M solution of $EMIPF_6$ in 20% $SO_2$ in a PC solvent would be expected to have an increased conductivity ($\approx$24 mS/cm at room temperature) and a useful temperature range below −60° C. compared to the solvent alone, which is limited to −40° C. A similar solution with added $CO_2$ has comparable improvement over the solvent alone.

Figure 4:
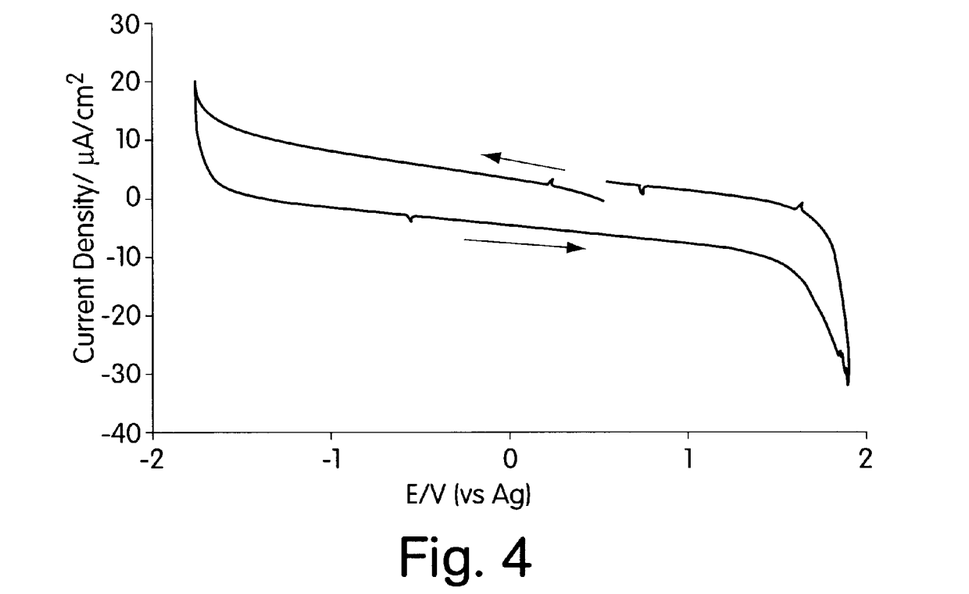
FIG. 4 is a cyclic voltammogram of 2M $EMIPF_6$ in PC.

Electrochemical stability Electrochemical stability determination via cyclic voltammetry was accomplished with a freshly polished glassy carbon (0.077 $cm^2$) disk working electrode and a Pt foil (8 $cm^2$) counter electrode. Referring to FIG. 4, the cyclic voltammogram of 2M $EMIPF_6$ in PC indicates a 3.6 V window of stability (current density of 20 $\mu A/cm^2$) between the onset of $EMI^+$ reduction (−1.8 V vs. $Ag/Ag^+$) and $PF_6^-$ oxidation (1.8 V). A similar window of electrochemical stability with $EMIPF_6$ in the other solvents studied was also observed.

Figure 5:
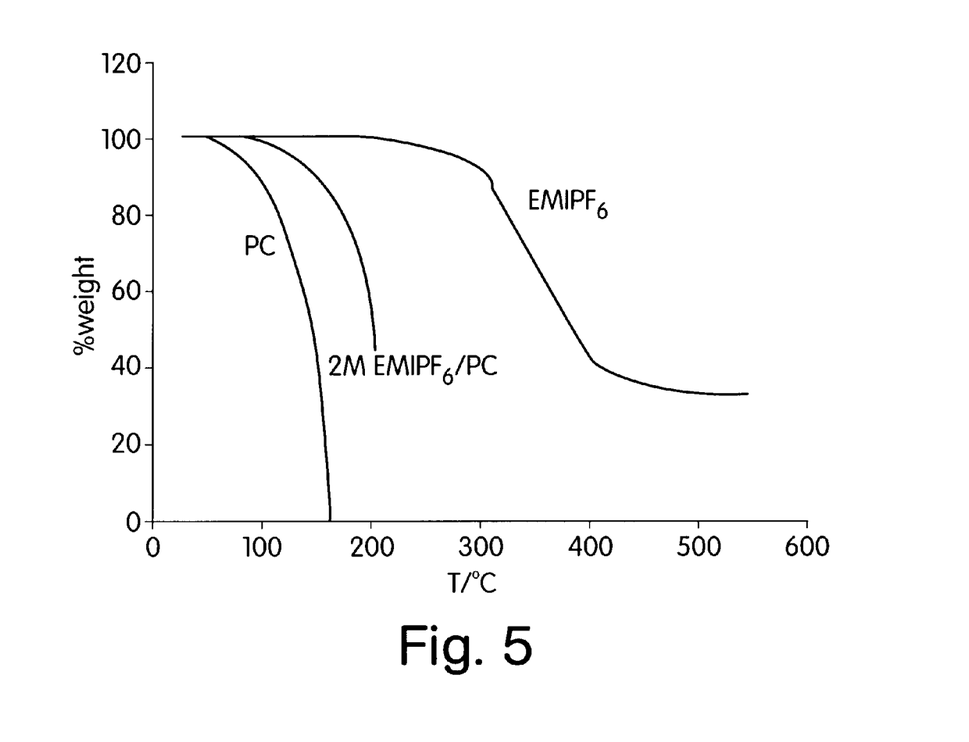
FIG. 5 shows thermal gravimetric analysis (TGA) results comparing PC, $EMIPF_6$ and $EMIPF_6$/PC.

Thermal stability The thermal stability of the electrolyte is important for high temperature capacitor applications. Heating 2M $EMIPF_6$/PC to 125° C. in a sealed glass ampoule results in no color change after 1 day, in contrast to the observation of color change (yellow tinge) observed with 1M $TEABF_4$/PC at 125° C. Referring to FIG. 5, the thermal stability of $EMIPF_6$, PC and 2M $EMIPF_6$/PC by thermal gravimetric analysis (TGA) was also investigated. Propylene carbonate volatility above 100° C. is a concern for device design at these temperatures. As determined by TGA, the addition of $EMIPF_6$ decreases the volatility of PC. The salt $EMIPF_6$ was thermally stable up to about 200° C., where 60% weight loss was observed between 200° C. and 400° C.

Figure 6:
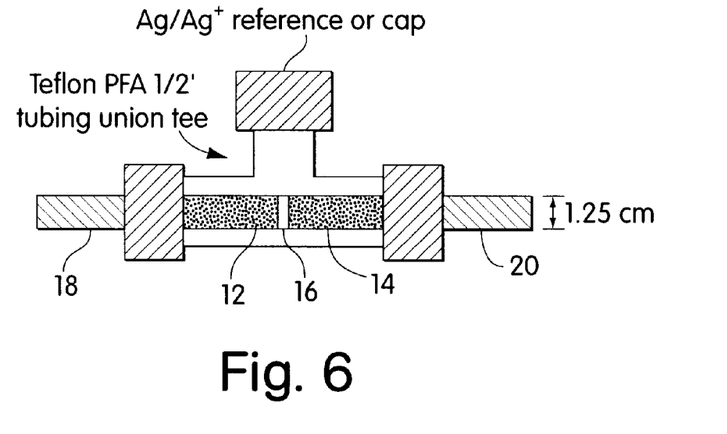
FIG. 6 shows a Tee-cell for testing the capacitance of electrolytes of the invention.

Tee-Cell measurement of capacitance Initial capacitance measurements and determination of electrochemical characteristics were carried out using a Tee-cell configuration, as depicted in FIG. 6. Two carbon electrodes 12, 14 (1 $cm^2$) were placed on either side of a Whatman GF/A separator 16 and compressed using 316L stainless steel rods 18, 20 as current collectors. The electrolyte 2M $EMIPF_6$/PC had a discharge capacitance density of 32 F/g·cell at 3 V with a current density of 5 $mA/cm^2$. Excellent coulombic efficiency (>99%) and leakage current (<100 $\mu A/cm^2$) values were observed. The capacitance increased slightly at lower current densities (33 F/g·cell at 1 $mA/cm^2$). Similar capacitance values of 32 F/g·cell were observed with 2M $EMIPF_6$ in a 1:1 (v/v) PC/EMC solvent mixture. These capacitance densities are roughly a 10% improvement over that observed with 1M $TEABF_4$ in PC. Slow galvanostatic charging (5 $mA/cm^2$) of 2M $EMIPF_6$/PC up to 4 V on a modified carbon electrode is possible with good coulombic efficiency (93%) and capacitance (36 F/g·cell) observed at 3.5 V. This greater capacitance and voltage increases the energy density of the capacitor.

As shown in Table 3, similar specific capacitance values (125–140 F/g) were observed regardless of the dielectric constant of the solvent for $EMIPF_6$ or $EMIBF_4$ based electrolytes. The specific capacitance of $EMIPF_6$ and $EMIBF_4$ are approximately 10% greater than that observed with $TEABF_4$.

TABLE 3

Specific capacitance (C) of 2M salts in indicated solvents at 25° C.

| Solvent (a) | Salt | C/F/g |
|---|---|---|
| EC | $EMIPF_6$ | 123 |
| PC | $EMIPF_6$ | 127 |
| DMC | $EMIPF_6$ | 126 |
| EMC | $EMIPF_6$ | 123 |

TABLE 3-continued

Specific capacitance (C) of 2M salts in indicated solvents at 25° C.

| Solvent (a) | Salt | C/F/g |
|---|---|---|
| EC/DMC | EMIPF$_6$ | 129 |
| EC/DMC | EMIBF$_4$ | 135 |
| PC/EMC | EMIPF$_6$ | 129 |
| PC/MF | EMIPF$_6$ | 140 |

(a) mixtures of solvents are at a ratio of 1:1 (v/v)

Materials and Methods

Synthesis of 1-ethyl-3-methylimidazolium hexafluorophosphate (EMIPF$_6$) was carried out via EMICl or EMIBr as intermediates, EMICl or EMIBr being converted to the desired product by a metathesis reaction with KPF$_6$ (Aldrich, 98%). EMICl was synthesized by reacting 1-methylimidazole (Aldrich, >99%) with chloroethane neat for 30 days at room temperature in a 1 liter closed glass vessel. EMIBr was synthesized following the procedure of Bonhôte et al., J. Electrochem. Soc. 143:3099 (1996), by reacting methylimidazole with bromdethane (Aldrich, >99%) in either ethyl acetate (Aldrich) or 1,1,1-trichloroethane (Aldrich). The EMICl or EMIBr was dissolved in water (3M) and added to a heated (50° C.) aqueous solution (1M) of KPF$_6$ to form the desired EMIPF$_6$ product as a denser oil which solidifies/crystallizes upon cooling (Fuller et al., J. Chem. Soc., Chem. Commun. 299, 1994; Carlin et al., J. Electrochem. Soc. 141:L73, 1994). This solid was recrystallized from water and dried under vacuum (55° C., <0.01 torr) to form the EMIPF$_6$ (m.p. 58° C., $^1$H NMR). The room temperature molten salt EMIIm was obtained from the metathesis reaction of EMICl with lithium bis((trifluoromethyl)sulfonyl)imide (LiIm, 3M Company). EMIBF$_4$ was synthesized from EMICl and AgBF$_4$ according to the procedure of Carlin et al., J. Electrochem. Soc. 141:L73 (1994). Tetraethylammonium tetrafluoroborate (TEABF$_4$) and hexaf luorophosphate (TEAPF$_6$) were obtained from Sachem (Austin, Tex.) and used after vacuum drying (120° C., <0.01 torr, 48 hr.).

The solvents propylene carbonate (PC, Grant or Burdick & Jackson), ethylene carbonate (EC, Grant), dimethyl carbonate (DMC, Grant), diethyl carbonate (DEC, Grant), and ethyl methyl carbonate (EMC, Mitsubishi Chemical Co) were used after drying over activated 3 Å molecular sieves. A Mettler DL 18 Karl Fischer titrator was used to determine water content of the electrolytes (typically less than 20 ppm). Pieces of Spectracarb 2220 activated carbon fiber cloth (SPECTRACARB, Lawrence, Mass.) were used as electrodes after vacuum drying (120° C., <0.01 torr, 48 hr.). This electrode material is composed of woven carbon fibers, 10 $\mu$m in diameter, with a reported BET surface area of 2000 m$^2$/g and a cloth density of 13 mg/cm$^2$.

All electrolyte preparation and work was performed in a VAC dry box (<10 ppm H$_2$O) under an Ar atmosphere. Conductivity measurements were performed using a General Radio 1656 Impedance Bridge with a Fisher conductivity cell having a cell constant of 9.35 (conductivity cells were calibrated with a KCl solution). A Tenney environmental chamber was used for controlling the temperature to ±1° C. An EG&G 273A Potentiostat/Galvanostat was used to obtain cyclic voltammetric and galvanostatic data. A Ag/AgNO$_3$ (10 mM concentration) couple in either 1M TEABF$_4$/PC or 2M EMIPF$_6$/PC was used as a reference electrode (with a Pt counter electrode), and was poised at 3.2 V vs Li/Li$^+$. Thermal gravimetric analysis (TGA) was performed on a Shimadzo TGA-50 under flowing nitrogen with a ramp rate of 10° C./min. AC impedance data were obtained with a Schlumberger SI1250 frequency response analyzer.

Use

As the electrolyte EMIPF$_6$ in propylene carbonate provides greater energy and power density than TEABF$_4$ in propylene carbonate and as the higher ion concentration obtainable with EMIPF$_6$ results in increased conductivity (18%) and capacitance (10%), the EMIPF$_6$/PC electrolyte system was tested in single cell and multi-cell capacitor devices. These results are expected to apply to other non-aqueous electrochemical capacitors, such as the Type III redox polymer system (Ren et al. in Electrochemical Capacitors, F. M. Delnick and M. Tomkiewicy, Editors, PV95-29, p.15, The Electrochemical Society Proceedings Services, Pennington, N.J. (1996); Arbizzani et al., Adv. Mater. 8: 331, 1996) since the high concentration and increased conductivity obtainable for these electrolytes is expected to be possible for other non-aqueous systems.

Single Cell Single cell nonaqueous double-layer capacitors, using the electrolytes of the invention, were constructed in a prismatic configuration as described in co-pending U.S. patent application Ser. No. 08/910,146 now allowed filed this day entitled "Nonaqueous Electrical Storage Device," the whole of which is hereby incorporated by reference herein.

Figure 7A:
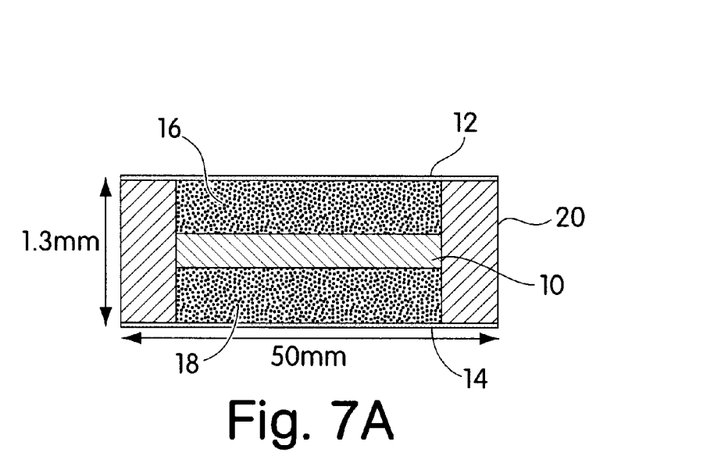
FIGS. 7A and 7B show a single cell pouch capacitor for use with the electrolyte of the invention and a stack of cells for high voltage application, respectively.

Referring to FIG. 7A, two separated high surface area carbon cloth electrodes 16 and 18, in contact with an electrolyte in chamber 10, were sandwiched between 12 $\mu$m thick stainless steel current collectors 12 and 14, preferably stainless steel or more preferably a conductive polymer having a flow temperature >130° C. (e.g., COER-X, Rexam Graphics, S. Hadley, Mass.), and perimeter sealed with a thermoplastic, high temperature gasket 20 to form a single cell prismatic device.

The seal 20 is a thermoplastic, typically of a polyester or polyurethane nature, that flows above 100° C. but below the softening temperature of current collectors 12 and 14. The material of gasket seal 20 is chosen to have good internal cohesion during a reflow treatment and good adhesion to the current collections. High temperature thermoplastics typically used for gasket 20 are from Beamis Associates, Inc., Shirley, Mass. (e.g., polyesters no. 5209 and 5214, and polyurethane no. 3209 and 3214).

Figure 7B:
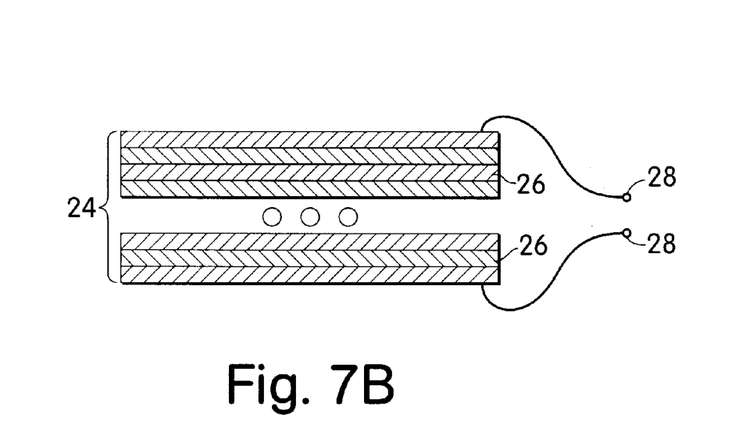

The single cell devices or pouches, typically of any size, these being 5×5 cm with an active area of 13 cm$^2$ and a total weight and volume of 2.6 g and 2.5 ml, respectively, were constructed, filled with the desired electrolyte, preferably EMIPF$_6$ in an alkyl carbonate solvent, and sealed in an Ar filled dry box before being removed from the inert atmosphere. The cell of FIG. 7A has connections 22 to external circuitry or can be electrically contacted via the external surfaces of conductors 16 and 18. As shown in FIG. 7B, the cells may be series connected to form a stack 24 of individual cells 26. Conductors 28 connect external circuitry. A custom built "MACCOR" (Oklahoma City, Okla.) series 4000 cycler was used for collecting constant power and current cycling data. Extended cycling data were obtained using a constant current charge/discharge cycle (50 mA), where each cycle takes roughly 18 minutes. A single cell can exhibit a 3 V, 11 Farad capacity. A stack of cells, under pressure of typically 100 psi, can exhibit a 100 V and 0.3 Farad capacity.

Figure 8:
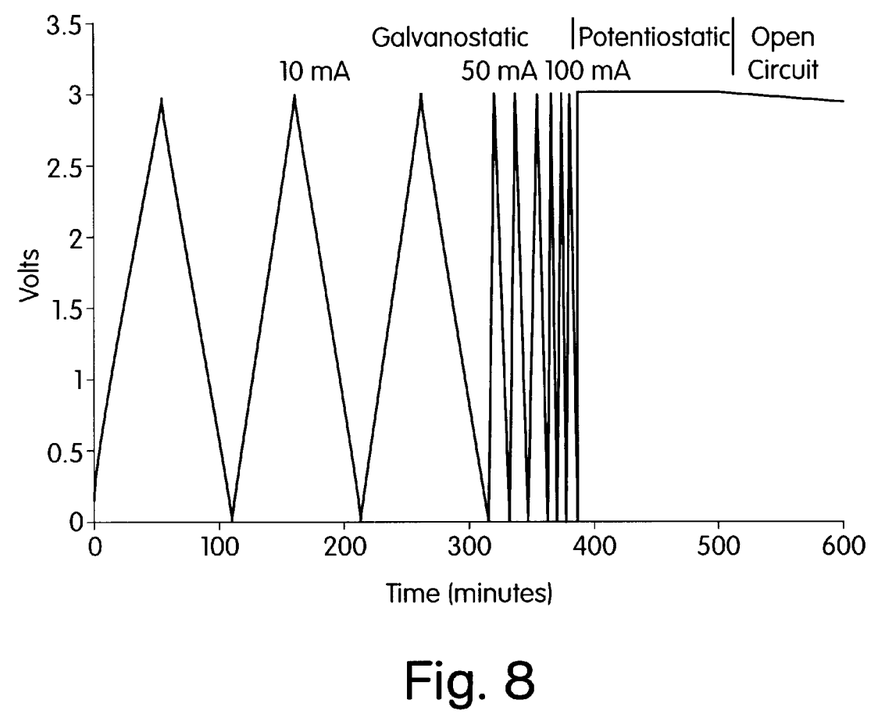
FIG. 8 shows three galvanostatic charge/discharge cycles for each of the three currents (10, 50 and 100 mA) followed by a potentiostatic charge at 3 V for 2 hr and an open circuit rest for 2 hr, from a single cell pouch of the invention.
Figure 9:
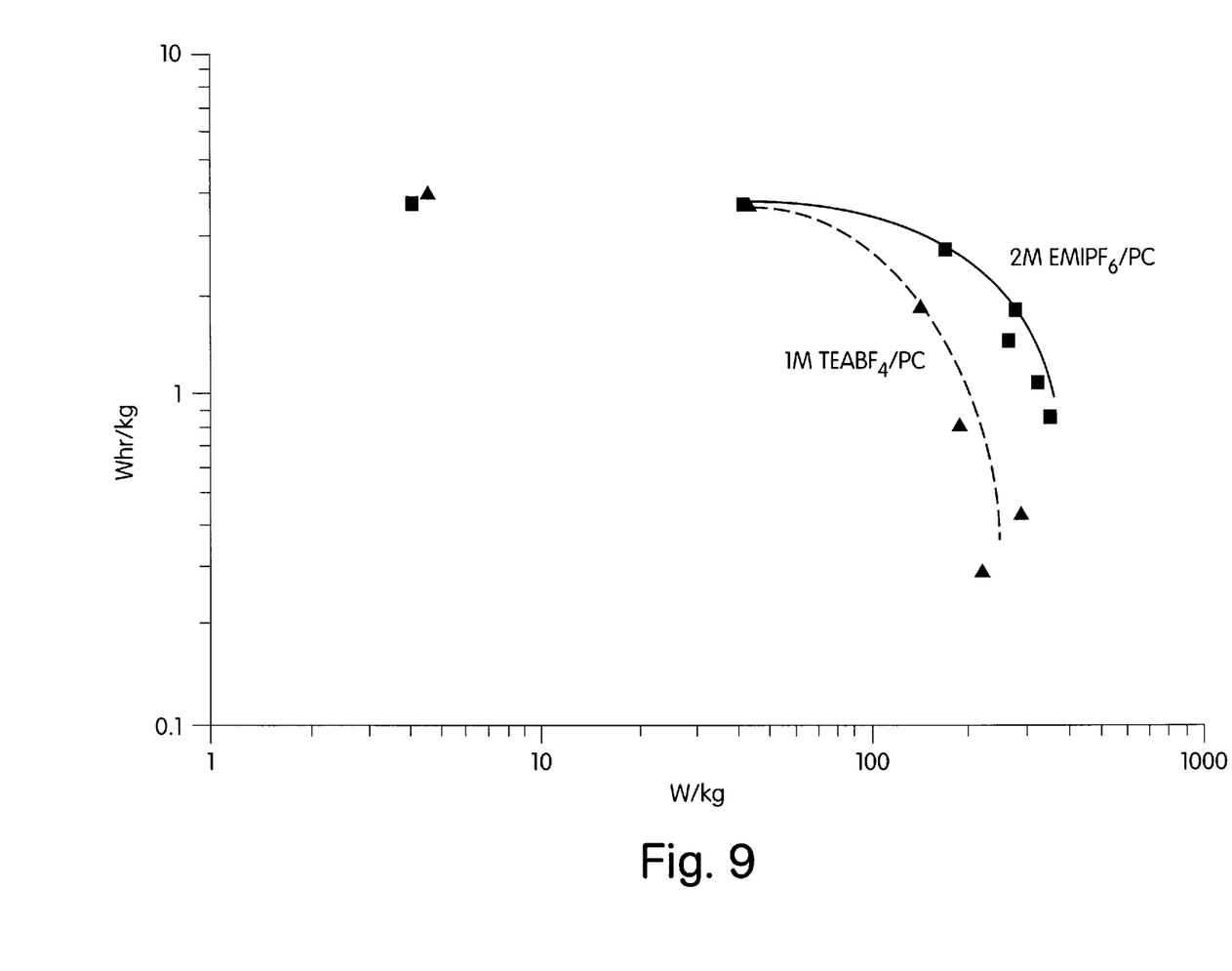
FIG. 9 shows a Ragone plot comparing the performance of an electrolyte of the invention, 2M $EMIPF_6$ in propylene carbonate, to a prior art electrolyte, 1M $TEABF_4$ in the same solvent.

Galvanostatic and potentiostatic charging of the single cell pouches exhibited excellent reversability (>98%) and charge storage capability. Referring to FIG. 8, three charge/discharge cycles at three currents (10, 50, and 100 mA), followed by a potentiostatic charge for 2 hours and 2 hours at open circuit are depicted. The pouches have a capacitance of 11 F at 3 V, resulting in a packaged energy density of 5.3 Whr/kg and 5.5 Whr/l. Only a 70 mV drop in voltage was observed after 2 hours at open circuit. As expected, and as illustrated in the Ragone plot shown in FIG. 9, the higher capacitance and conductivity of the 2M EMIPF$_6$/PC electrolyte compared to 1M TEABF$_4$/PC results in greater energy and power. Over 2000 charge/discharge cycles were obtained with little (5%) drop in capacity.

Multicell A 30 V 1 F multicell device was constructed from twelve pouches in series configuration. The initial galvanostatic charge/discharge was at 10 mA with three cycles at 15 V, three at 25 V, and finally three at 30 V. In addition to the three galvanostatic charge/discharge cycles at each voltage, a final potentiostatic charge (30 min) and an open circuit rest (2 hr.) were performed. This device was cycled for 1000 cycles at several currents (10–100 mA) with little loss in energy.

While the present invention has been described in conjunction with a preferred embodiment, one of ordinary skill, after reading the foregoing specification, will be able to effect various changes, substitutions of equivalents, and other alterations to the compositions and methods set forth herein. It is therefore intended that the protection granted by Letters Patent hereon be limited only by the definitions contained in the appended claims and equivalents thereof.

We claim:
1. A nonaqueous electrolyte for an electrical storage device comprising a salt consisting of:
  a cation selected from the group consisting of:

Pyridinium  Pyridazinium

Pyrimidinium  Pyrazinium

Imidazolium  Pyrazolium

Thiazolium  Oxazolium

-continued

Triazolium wherein $R_1$, $R_2$, $R_3$, $R_4$, $R_5$, and $R_6$ are either H; F; separate alkyl groups of from 1 to 4 carbon atoms, respectively, or joined together to constitute a unitary alkylene radical of from 2 to 4 carbon atoms forming a ring structure converging on N; or separate phenyl groups; and wherein the alkyl groups, alkylene radicals or phenyl groups may be substituted with electron withdrawing groups; and a perfluoro, inorganic anion or a perfluoro, organic sulfonate anion having a Van der Waals volume $\leq 100$ Å$^3$, said salt being dissolved at a concentration of greater than 0.5M in an organic liquid.

2. The electrolyte of claim 1 wherein said organic liquid is selected from the group consisting of linear ethers, cyclic ethers, esters, carbonates, formates, lactones, nitriles, amides, sulfones and sulfolanes.

3. The electrolyte of claim 1 wherein said salt is dissolved in liquid sulfur dioxide.

4. The electrolyte of claim 1 wherein said salt is dissolved in a combination of an organic liquid and a low viscosity additive selected from the group consisting of sulfur dioxide, carbon dioxide, nitrogen dioxide, nitrous oxide and other stable inert gases.

5. The electrolyte of claim 1 wherein the cation is 1-ethyl-3 methyl imidazolium.

6. The electrolyte of claim 1 wherein the anion is selected from the group consisting of PF$_6^-$, BF$_4^-$, A$_s$F$_6^-$ and triflate.

7. The electrolyte of claim 1 wherein the salt is EMIPF$_6$.

8. The electrolyte of claim 1 wherein the salt is EMIBF$_4$.

9. The electrolyte of claim 7 wherein the organic liquid is a cyclic carbonate, an acyclic carbonate, methyl formate or a combination thereof.

10. The electrolyte of claim 9 wherein said salt is dissolved in said organic liquid at a concentration of greater than 2M.

11. The electrolyte of claim 8 wherein said salt is dissolved in said organic liquid at a concentration of greater than 3M.

12. The electrolyte of claim 1 further comprising a salt consisting of a cation selected from the group consisting of:

wherein $R_1$, $R_2$, $R_3$ and $R_4$ are separate alkyl groups of from 1 to 10 carbon atoms, respectively, or are joined together to constitute a unitary alkylene radical of from 2 to 20 carbon atoms forming a ring structure converging on N or P, respectively;

and an anion having a van der Waals volume less than or equal to 100 Å$^3$.

* * * * *

UNITED STATES PATENT AND TRADEMARK OFFICE
CERTIFICATE OF CORRECTION

PATENT NO. : 5,965,054
DATED : October 12, 1999
INVENTOR(S) : Alan B. McEwen, et al.

It is certified that error appears in the above-identified patent and that said Letters Patent is hereby corrected as shown below:

Title page,
Item [75], Inventors, "Ein-Eli Yair", should read -- Yair Ein-Eli --;

Column 3,
Line 26, "ctrocatalysis", should read -- electrocatalysis --;

Column 4,
Line 7, "TEADF$_4$", should read -- TEABF$_4$ --;
Line 33, "Solubility", should read -- Solubility --;
Line 47, "Conductivity", should read -- Conductivity --;

Column 5,
Line 57, "Temperature range", should read -- Temperature range --;

Column 6,
Line 7, "Electrochemical stability", should read -- Electrochemical stability --;
Line 17, "Thermal stability", should read -- Thermal stability --;
Line 30, "Tee-Cell measurement of capacitance", should read -- Tell-Cell measurement of capacitance --;

Column 7,
Line 23, "bromdethane", should read -- bromoethane --.

Signed and Sealed this

Sixteenth Day of October, 2001

*Attest:*

*Attesting Officer*

NICHOLAS P. GODICI
*Acting Director of the United States Patent and Trademark Office*